United States Patent Office 3,110,601
Patented Nov. 12, 1963

3,110,601
ORGANIC SILICATE MATERIALS
Harold Garton Emblem, Grappenhall, and Norman Albert Hurt, Lymm, England, assignors to Philadelphia Quartz Company, Philadelphia, Pa., a corporation of Pennsylvania
No Drawing. Filed Nov. 23, 1960, Ser. No. 71,156
Claims priority, application Great Britain Nov. 27, 1959
8 Claims. (Cl. 106—55)

This invention relates to new organic silicate materials, to their preparation and to their use.

The organic silicate materials of the present invention are condensation products of an aminoalkyl silicate and a compound possessing one oxirane grouping, that is the grouping

More particularly, the invention provides condensation products of an aminoalkyl silicate and an oxirane compound of the formula

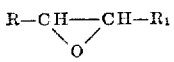

wherein R and $R_1$, which may be the same or different, each represent hydrogen, the aldehyde group; a saturated or unsaturated, substituted or unsubstituted aliphatic group with 1 to 6 carbon atoms; the phenyl group; an alkyl-phenyl group of which the alkyl radical has 1 to 6 carbon atoms; or the benzyl group. Examples of substituents in an aliphatic group are the aldehyde, hydroxyl and ether groups. R and $R_1$ may therefore be, for example, a hydrogen atom; an alkyl group such as methyl, ethyl, n-propyl, isopropyl or a hexyl group; an alkenyl group such as the vinyl, allyl, prop-1-enyl or but-1-enyl group; or the phenyl group or an alkyl-phenyl group such as the toluyl, ethylphenyl, n-propylphenyl or n-butyl-phenyl group; or the benzyl group. Examples of the oxirane compound are ethylene oxide, 1,2-propylene oxide, glycidol, styrene oxide, 1,2-butylene oxide, 2,3-butylene oxide, allyl glycidyl ether, 1,2-epoxy-3-phenoxypropane and the oxirane octylene oxides.

The silicates can be orthosilicates of the general formula $Si(OR_2)_x(OR_3)_{4-x}$ where $R_2$ is an alkyl group carrying an amino group having one of two hydrogen atoms attached to the nitrogen atom, $R_3$ is an unsubstituted alkyl group, and $x$ has the value 1, 2, 3 or 4; they can be polysilicates of the empirical or unit formula $(R_2O)_y(R_3O)_{2-y}SiO$ where $R_2$ and $R_3$ have the above meanings and $y$ has a value greater than zero and up to 2; or they can be mixtures of orthosilicates and polysilicates.

The aminoalkyl groups of the silicate are suitably those derived from an aminoalcohol of the formula

where $R_4$ is a hydroxyalkyl group containing 1 to 6 carbon atoms; and $R_5$ is hydrogen, or an alkyl or monohydroxyalkyl group containing 1 to 6 carbon atoms; the number of hydroxyl groups of the alcohol not exceeding two. Preferred aminoalkyl groups are those derived from an alcohol of the above formula in which $R_4$ contains 2 to 4 carbon atoms and one hydroxyl group and $R_5$ is hydrogen or an alkyl or monohydroxyalkyl group with 1 to 4 carbon atoms; if $R_5$ comprises a hydroxyl group it preferably contains only two or three carbon atoms.

If the silicate contains unsubstituted groups $R_3O$, these may contain 1 to 15 carbon atoms and may, for example be, methoxy, ethoxy, propoxy, isopropoxy, butoxy, amoxy, hexoxy or nonoxy groups, but are preferably those containing 1 to 6 carbon atoms. In such instances, for polysilicates, the value of $y$ in the above formula is preferably at least 0.1, that is the polysilicates preferably contain at least 0.1 amino-substituted ester groups per silicon atom.

The aminoalkyl silicates can be prepared by interchange processes from alkyl silicates by which the alkyl groups, or some of them, are replaced by aminoalkyl groups. Thus, for example, the alkyl groups of methyl and ethyl orthosilicates can be partly or wholly replaced by aminoalkyl groups by refluxing the esters at an elevated temperature with an appropriate amount of an aminoalcohol comprising a primary or secondary amino group and removing by distillation the methyl and ethyl alcohols as they are formed. When the aminoalcohol used in the interchange process is of higher boiling point than the alcohol which it replaces, the replaced alcohol can be removed as it is formed, while unreacted aminoalcohol remains to continue replacement.

Orthosilicates of the formula $Si(OR_2)_x(OR_3)_{4-x}$ where $R_2$ and $R_3$ have the previous meanings and $x$ is equal to 1, 2 or 3 can be prepared by an interchange reaction between the terta-aminoalkyl orthosilicate $Si(OR_2)_4$ and the alcohol $R_3OH$ in those cases where the alcohol $R_3OH$ has a higher boiling point than the displaced amino-alcohol $R_2OH$. Thus, for example, 2-aminoethyl trinonyl orthosilicate $Si(OCH_2CH_2NH_2)(OC_9H_{19})_3$, (in admixture with the silicates $Si(OCH_2CH_2H_2)_2(OC_9H_{19})_2$ and $Si(OCH_2CH_2NH_2)_3(OC_9H_{19})$) can be prepared by heating under partial reflux 2-aminoethyl orthosilicate and nonyl alcohol and gradually distilling off the displaced ethanolamine until the reaction has proceeded to the appropriate extent.

Similar interchange processes can be carried out with the corresponding polysilicates, or mixtures of them with the orthosilicates.

It will be appreciated that an aminoalkyl silicate having a desired content of aminoalkyl groups may be produced from a similar aminoalkyl silicate in which the proportion of aminoalkyl groups is less than that of the desired product by reacting the material with a suitable amount of the appropriate aminoalcohol to increase the aminoalkyl group content of the initial material.

When an interchange reaction is carried out with only partial replacement of alkyl or aminoalkyl groups in an alkyl or aminoalkyl silicate by aminoalkyl or alkyl groups, respectively, the mixed esters which are formed cannot usually be separated by distillation, for in most instances disproportionation occurs and each mixed ester gives rise to a mixture of esters.

The extent of the interchange of the organic groups of an alkyl or aminoalkyl silicate, whether the silicate be orthosilicate, polysilicate or a mixture of orthosilicate and polysilicate, is conveniently expressed in terms of the number of aminoalkyl groups present in the final product per silicon atom. For any particular organic silicate material the quantity of aminoalcohol, for example, required to give a predetermined degree of replacement can be calculated from the silica content of the material concerned. Thus, for example, if it is required to produce by an interchange reaction between an alkyl silicate and an aminoalcohol a product in which there is one aminoalkyl group per silicon atom, then the reaction components are employed in the proportion of 1 g. mol. of aminoalcohol to that weight of organic silicate which contains 1 g. mol. of silica.

When a polysilicate material is condensed with an oxirane compound, there is preferably in the silicate, as stated above, at least 0.1 amino-substituted ester groups per silicon atom.

The present invention also provides a process for preparing novel organic silicate materials, which process comprises condensing an aminoalkyl silicate having primary or secondary amino groups with an oxirane compound of the formula

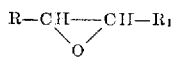

wherein R and $R_1$ have the above meanings. When R and $R_1$ are hydrogen or a group comprising only carbon and hydrogen, then in order to obtain a satisfactory rate of reaction the condensation process is preferably carried out by reacting the aminoalkyl silicate and the oxirane compound at or near the boiling point of the reaction mixture such as within about 10° C., and more preferably 5° C., of the boiling point of the reaction mixture. Whereas for most cases the condensation reaction is conveniently carried out under normal pressure, for ethylene oxide it may be desirable to carry out the reaction at a higher pressure, for example at a pressure corresponding to a reaction mixture boiling point of about 75° C. It should be noted, however, that, in those cases where self-condensation of the reaction product is possible, as discussed later, it is preferred to carry out the condensation reaction at a temperature not more than about 10° C. above the boiling point of the oxirane compound. The condensation should be carried out under substantially anhydrous conditions to prevent hydrolysis of the aminoalkyl silicate which may otherwise readily occur. Should any of the groups R and $R_1$ of the oxirane compound contain any substituent group, this should not, of course, be such that it reacts with the amino nitrogen or amino group during the condensation reaction. In practice, the most convenient way, in general, of performing the condensation is to heat the constituents under reflux. In some cases, as, for example, when the oxirane compound is the very reactive material glycidol, the condensation may be effected in the cold.

The number of mols of oxirane compound that can be condensed with an aminoalkyl silicate is dependent inter alia on the nature of the oxirane compound. It has been found that the number of mols of oxirane compound that can be condensed with a silicate decreases as the size of the molecule of the oxirane compound increases. Thus for the simplest oxirane compound, ethylene oxide, considerable numbers of molecules of this oxirane compound per active amino hydrogen atom of a silicate can be condensed, whereas for the butylene oxides only up to one mol of these oxirane compounds can be condensed with an aminoalkyl silicate per active amino hydrogen atom of the silicate.

For oxirane compounds other than ethylene oxide and propylene oxide 0.25 to 1 mol of oxirane compound is suitably employed in the condensation per active hydrogen atom of the silicate. For propylene oxide, 0.25 to 1.5 mol per active hydrogen atom may suitably be used. The condensation is generally substantially complete after 2 to 3 hours of heating if the oxirane compound is wholly aliphatic.

It will be appreciated that an oxirane compound reacts with a hydrogen atom of the amino nitrogen as follows, considering the case where the oxide is ethylene oxide

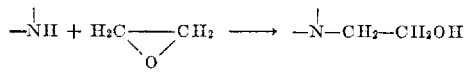

A molecule of ethylene oxide can also condense with the hydroxyl group produced by a previous condensation if excess is employed and the condensation reaction carried out under pressure.

In this way 10 mols or more ethylene oxide can be condensed per active amino hydrogen atom of the silicate.

In those cases where the ester groups of the silicate comprise a substituent hydroxyl group, the oxirane compound may also condense with such a hydroxyl group.

Some of the condensation products of the invention are water-miscible and stable in dilute solution for two to three days without gelation taking place. Such solutions may have surface-active properties and find application, for example, as textile auxiliaries. However, the addition of only small amounts of water, such as the addition of up to an equal volume of water, often causes these water-soluble condensation products to gel. Some of the water-immiscible products are also useful as, for example, textile auxiliaries by reason of their ability to emulsify oils, fats and waxes to give aqueous dispersions. The emulsifying properties can be utilized in the preparation of textile yarn lubricants and polishes, for example.

Gel-forming condensation products (including certain water-insoluble products in solution in a mutual solvent for the product and water), may be used as binders for particulate solid materials. Products having the desired rate of setting for any particular application can be obtained by, inter alia, an appropriate choice of the number of amino-alkoxy groups per silicon atom in the silicate; furthermore, in general, the rate of gelation decreases as the amount of condensed oxirane compound is increased. These gel-forming condensation products are of value as binders for ceramic materials to make moulds for use in investment casting processes or to make refractory articles such as refractory bricks or crucibles. In binding the solid materials, the material to be bound is mixed with an appropriate quantity of the gel-forming condensation product, shaped to the form desired, and the composition allowed to set by the action of water; no gelation accelerator is necessary. If the water to set the coating is incorporated in the mix, then it may be desirable to also include a mutual solvent for the water and the binder. The products can be used by mixing them with fine refractory powders to give slurries which are then used to coat a wax or other fusible or expendable pattern to derive an accurate and smooth surface in a mould made by investing the coated pattern by the normal methods of the investment process, for example using coarse refractory powders made into a slurry with acid-hydrolysed ethyl silicate solution. The coated pattern can be allowed to stand to take up atmospheric moisture to set the coating prior to investment but the setting can be speeded up by dusting with a coarse refractory powder moistened with water or an aqueous organic solvent. Furthermore, a ceramic shell mould can be made by the repeated dipping of a wax or other pattern into a slurry of fine refractory material and a gel-forming condensation product of the invention, with alternate dusting of a coarse refractory on to the coating; in order to speed up the process, a coarse refractory powder moistened with water or an aqueous organic solvent can be used for the dusting. It has been found that in spite of the fact that the silica contents of the condensation products of the invention are less than those of the original aminoalkyl silicates, the products when used as binders for refractories result in a stronger bonding which is due, it is believed, to the superior wetting properties of the products.

In those cases where the aminoalkyl silicate employed in the condensation contains unsubstituted organic groups, for example methoxy or ethoxy groups, and the condensation reaction is performed by heating, the silicate-oxirane condensate obtained may undergo a self-condensation reaction, which reaction takes place between the unsubstituted organic group and the hydroxyl group produced by the condensation of the amino group with the oxirane compound, the alcohol corresponding to the unsubstituted group being eliminated. When such a self-condensation is possible, it is desirable, if the self-condensation reaction is to be minimised, to ensure that the temperature at which the reaction mixture is heated is not more than about 10° C. above the boiling point of the oxirane compound. The self-condensation reaction may also occur if the reaction mixture is heated for longer periods than is necessary to complete the condensation of the silicate and oxirane compound. If the temperature is raised at the end of the silicate-oxirane condensation, then the self-condensation will occur to a greater extent.

The alcohol produced in the self-condensation may be removed by distillation. The compounds produced may be linear or cyclic. Thus, considering a polysilicate containing unsubstituted ethoxy groups and beta-amino ethoxy groups which have been condensed with ethylene oxide, the self-condensation reaction can be represented by the following reaction schemes:

(A) Formation of a linear structure by elimination of ethyl alcohol

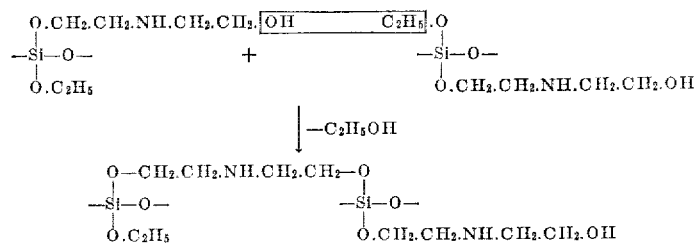

(B) Formation of a cyclic structure by elimination of ethyl alcohol

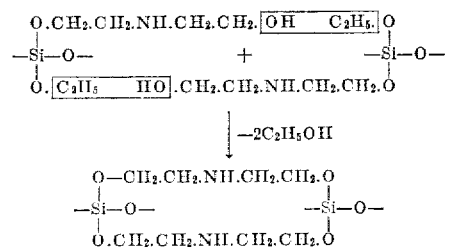

In the case of (A) the reaction may take place so as to cross-link two polysilicate chains.

Such self-condensation products are to be considered as within the scope of the invention.

As stated above, the self-condensation reaction can occur by prolonging the heating at the end of the silicate-oxirane condensation. A heat treatment of the condenstation products after their production is, in fact, a very simple and useful way of modifying the gelation behaviour of a gel-forming product of the original silicate-oxirane condenstation. The self-condensation process results in a condensation product less readily gelled by the action of water than the original product and thus by effecting, to an appropriate extent, self-condensation in a gel-forming product not sufficiently readily gelled, a useful way is afforded of obtaining a product having desired gelling characteristics.

The following examples illustrate the invention. Of the examples, Examples 1 to 24 illustrate the preparation of the condensation products of the invention and Examples 25 to 35 illustrate the applications of such products.

Example 1

Ethyl polysilicate having a silica content of 40% (134 g., 1 molecular unit) was condensed with monoethanolamine (45.75 g., 0.75 mol., the equivalent of 0.375 of the ethyl groups in the silicate) by heating and maintaining the mixture under partial reflux by a fractionating column allowing gradual distillation of the replaced ethyl alcohol. During three hours the theoretical quantity of alcohol was recovered leaving a monoethanolamine ethyl polysilicate which is referred to hereinafter as product A.

Product A was then heated with 1 mol. of 1,2-propylene oxide (corresponding to 1.33 mol. of oxide per $NH_2$ group of the silicate) at the boiling point of the oxide under gentle reflux for 1½ hours; the condensation product obtained is referred to subsequently as product B.

To the reaction product B a further 1 mol. of 1,2-propylene oxide was added and gently refluxed at the boiling point of the oxide for 1½ hours; the product obtained is referred to subsequently as product C.

Products B and C were found to be very much more stable in dilute aqueous solution than product A. A solution of the latter product obtained by mixing it with four times its volume of water, formed a gel within 10 seconds, the reaction being exothermic. Contrasted with this, product B was much more stable, a frothy, cloudy solution being obtained. For product C a very stable, completely miscible clear solution was produced which gave a heavy froth on shaking.

The viscosity of product B while less than that of product C was greater than that of product A.

The products B and C although stable in dilute solution were found to form gels with small volumes of water. Thus, for product C gelation occurred on adding 10% of its volume of water in about 20 to 30 minutes. When 20% of water was used gelation occurred in about 6 minutes and when using 50% by volume of water, in about 11 minutes.

Example 2

In a manner similar to that described in Example 1 the product obtained by reacting the ethyl polysilicate with 0.75 mol. of monoisopropanolamine was condensed with 2 mols. of 1,2-propylene oxide. The material produced was almost immiscible with water, but formed an emulsion easily. It did not gel like the products B and C of Example 1.

Example 3

1 mol. of 0.75 monoethanolamine-substituted ethyl polysilicate (product A), prepared by the method described in Example 1, was reacted with 1 mol. of styrene oxide, corresponding to 1.33 mol. of oxide per $NH_2$ group of the silicate. The mixture was refluxed for 16 hours to complete the condensation. The material obtained was immiscible with water and did not gel.

Example 4

(2-amino-but-1-yl) orthosilicate was prepared by heating a mixture of 1 mol. of tetraethyl orthosilicate with 4 mols. of 2-amino-butan-1-ol and maintaining the mixture under gentle reflux by a fractionating column allowing the distillation of the ethyl alcohol as it was formed. After four hours the theoretical quantity of alcohol for replacement of all the ethyl groups had been collected. The product obtained was then condensed with 8 mols. of 1,2-propylene oxide, corresponding to 2 mols. of oxide per $NH_2$ group, 8 hours being required to complete the reaction. The condensation product obtained was completely miscible with water and formed a slight froth on shaking with water but did not gel. The product had emulsifying properties as is shown in Example 31.

Example 5

Two g. mols. of product A of Example 1 were condensed with 3 g. mols. of propylene oxide, corresponding to 2 mols. of oxide per $NH_2$ group of the silicate, by heating them for 1½ hours at the boiling point of propylene oxide under reflux. 5 ml. of condensate were mixed with 0.3 ml. of water and the mixture gelled in 10 minutes.

Example 6

This example illustrates the self-condensation reaction that takes place if the conditions under which the product B of Example 1 was prepared are suitably modified.

Thus product A of Example 1 was heated with 1 mol. of 1,2-propylene oxide for ten hours at a temperature of about 80° C., the ethyl alcohol produced being distilled off. The reaction produced had a much greater water-stability than product B, since with 10 ml. of the product, 1, 2 and 5 mls. of water did not cause gelation and 7 ml. and 10 ml. of water only after 145 and 129 minutes, respectively.

Example 7

1 mol. of 0.75 monoethanolamine-substituted ethyl polysilicate, prepared by the method described in Example 1, was condensed with 1.5 mols. of butylene oxide, corresponding to 2 mols. of oxide per $NH_2$ group. The oxide consisted of a mixture of the normal isomers 1,2-butylene oxide and 2,3-butylene oxide present in the ratio 4:1. The condensation was effected by heating the reaction components under reflux for two hours. The condensation product was not water-miscible and formed a gelatinous precipitate at the interface. The product when mixed with a mutual solvent for the product and water may be used for binding refractory powders.

Example 8

1 mol. of 1.5 monoethanolamine-substituted ethyl polysilicate was condensed with 3 mols. of butylene oxide, corresponding to 2 mols. of oxide per $NH_2$ group. The oxide had the composition given in Example 7. The condensation was effected by heating the reaction components under reflux for two hours. The condensation product was not water-miscible and formed a gelatinous precipitate at the interface. The product when mixed with a mutual solvent for the product and water may be used for binding refractory powders.

Example 9

1 mol. of ethanolamine orthosilicate $Si(OC_2H_4NH_2)_4$ was condensed with 4.64 mols. of butylene oxide, corresponding to 1.16 mols. of oxide per $NH_2$ group. The oxide had the composition given in Example 7. The condensation was effected by heating the reaction components under reflux for two hours. The condensation product was a stable product, immiscible with water.

Example 10

1 mol. of ethanolamine orthosilicate $Si(OC_2H_4NH_2)_4$ was condensed with 6 mols. of butylene oxide corresponding to 1.5 mol. of oxide per $NH_2$ group. The oxide had the composition given in Example 7. The condensation was effected by heating the reaction components under reflux for two hours. The condensation product was a stable product giving a clear aqueous solution.

Example 11

1 mol. of (2-amino-but-1-yl) orthosilicate $$Si(OCH_2.CH.NH_2.CH_2.CH_3)_4$$

prepared as described in Example 4, was heated for 16 hours under reflux with 16 mols. of butylene oxide, corresponding to 4 mols. of oxide per $NH_2$ group. The oxide had the composition given in Example 7. It was found that only 2 mols. of oxide per $NH_2$ group condensed with the silicate. A stable condensation product was obtained which was only partially miscible with water.

Example 12

162 g. of a mixture of isopropyl orthosilicate and polysilicates comprising 10% orthosilicate and having a silica content of 37% were reacted with 0.75 mol. of monoethanolamine to give a product consisting of two liquid phases. This product was then condensed with 1.5 mol. of propylene oxide (corresponding to about 2 mols. of oxide per $NH_2$ group of the aminoalkyl silicate) by heating them for 4 hours under reflux. A homogeneous product was obtained.

Example 13

Example 12 was repeated using monoisopropanolamine instead of monoethanolamine. A similar result was obtained.

Example 14

1 mol. of monoethanolamine orthosilicate $$Si(OC_2H_4NH_2)_4$$

was condensed with 4 mols. of glycidol

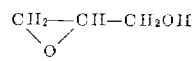

corresponding to 1 mol. of oxide per $NH_2$ group. The silicate and oxide were condensed in the cold, a vigorous reaction between these substances occurring. The reaction was carried out by adding the glycidol drop-wise into the monoethanolamine orthosilicate in a flask surrounded by an ice-water mixture. The condensation product was a viscous pale yellow liquid, soluble in water giving a stable solution.

Example 15

1 mol. of n-amyl orthosilicate and 1 mol. of diethanolamine were reacted, 1 mol. of n-amyl alcohol being recovered. The resulting aminoalkyl silicate was condensed with 2 mols. of propylene oxide by heating until reflux of propylene oxide ceased which occurred after about one hour; there was no loss of weight during condensation. The condensation product was a yellow viscous liquid. 10 ml. of this product was miscible with 2 ml. of water, the mixture gelling on standing overnight. The product was fairly stable to water. 10 ml. of the uncondensed aminoalkyl silicate when mixed with 2 ml. of water gelled in 30 seconds but did not give a coherent gel.

Example 16

1 mol. of n-butyl orthosilicate and 1.04 mol. of diethanolamine were reacted, 1.21 mol. of n-butanol being recovered. 10 ml. of this aminoalkyl silicate when mixed with 2 ml. of water gelled in 20 seconds. 123 g. (0.375 mol.) of the aminoalkyl silicate were condensed with 45 g. (0.75 mol.) propylene oxide by heating the reactants under reflux for 3 hours after which time refluxing ceased. 165 g. of gross product was recovered. 10 ml. of the condensation product were miscible with 2 ml. of water and gave a solution which gelled in 2½ hours.

Example 17

A mixture of n-butyl orthosilicate and polysilicates was prepared by reacting 1.5 mol. of silicon tetrachloride with 6 mols. of n-butanol. When reaction was complete, the mixture was warmed to 50° C. and a mixture of 100 g. of butanol and 22 ml. of water added, nitrogen being blown through the mixture of silicates during the warming and addition of the butanol/water mixture. On completion of the addition, the mixture was heated under reflux for 1 hour and excess butanol then removed by distillation. 274.3 g. of butyl silicate were obtained.

190 g. of this butyl silicate and 46 g. ethanolamine were reacted, 56 g. of butyl alcohol being recovered. 5 ml. of the resulting aminoalkyl silicate gelled in 15 seconds on mixing with 1 ml. of water.

90 g. of the aminoalkyl silicate were condensed with 43.5 g. propylene oxide by heating until reflux of propylene oxide ceased. 5 ml. of the condensation product were miscible with 1 ml. water giving a solution which gelled on standing overnight.

Example 18

Ethylene oxide with nitrogen as carrier gas was blown into monoethanolamine orthosilicate at 120° C. containing, as a catalyst for the condensation, potassium hydroxide pellets in an amount by weight equal to 5% of the weight of the silicate. A brown product exothermically soluble in water was obtained. The product had a silica content of 9.55%, corresponding to a condensation of 2 mols. of oxide per $NH_2$ group of the aminoalkyl silicate. The product formed a skin on standing in air. The product may be used for binding refractories.

*Example 19*

This example concerns a method of condensing ethylene oxide with monoethanolamine orthosilicate by carrying out the reaction in a bomb calorimeter.

Ethylene oxide (11.0 g.) and monoethanolamine orthosilicate (4.2 g.) were charged into a bomb calorimeter of 275 cc. volume, the amount of the reactants being sufficient to give a maximum pressure of 24 atmospheres at 75° C., assuming complete volatilisation of the ethylene oxide. The bomb and contents were left at 75° C. for 30 minutes and then allowed to cool at room temperature. A further quantity of ethylene oxide was then added sufficient to give the same pressure at the same temperature. This sequence was repeated four times until about 20 mols. of ethylene oxide had been condensed per $NH_2$ group of the silicate. The product was a red-brown liquid of low viscosity, miscible with water, not exothermically, and giving a stable solution. The silica content was 1.47% corresponding to 21.5 mols. of ethylene oxide per $NH_2$ group.

*Example 20*

134 g. of monoethanolamine orthosilicate (0.5 mol.) were reacted with 200 g. (1 mol.) of tridecanol, a mixture of $C_{13}$ saturated branched chain alcohols, to prepare a silicate composition corresponding to the formula $$Si(OC_2H_4.NH_2)_2(C_{13}H_{27}O)_2$$

The mixture was refluxed for 30 minutes, after which the liberated monoethanolamine (61 g.) was slowly distilled off.

The product was reacted with 1 mole (58 g.) of propylene oxide (that is, sufficient to react with one $NH_2$ group of the silicate), by warming for one hour on a steam bath, under a reflux condenser. The reaction was exothermic, the temperature of the reaction mixture rising to 140° C. There was no refluxing during the condensation. The product had a silica content of 9.07% (required 9.04%).

*Example 21*

67 g. monoethanolamine orthosilicate (0.25 mol.), and 144 g. of butylene oxide isomers (2 mole) of the composition described in Example 7 were condensed by heating them under reflux for 2 hours, after which refluxing ceased. Heating was continued for a further hour. There was no loss of butylene oxide during the heating. The product was a yellow oil miscible with water. The amount of oxide employed corresponded to 2 moles per $NH_2$ group of the silicate.

*Example 22*

17.8 g. of monoethanolamine orthosilicate were condensed with 28.5 g. of allyl glycidyl ether

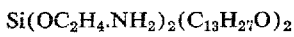

(corresponding to 1 mol. of the ether per $NH_2$ group of the silicate) by dropping the allyl glycidyl ether on to the monoethanolamine orthosilicate contained in a flask cooled by ice. This mixture was allowed to reach room temperature, the condensation proceeding quietly at room temperature. The product was water-soluble, and was shown to be unsaturated.

*Example 23*

10.121 kg. of ethyl polysilicate having a silica content of 40%, and 3.459 kg. of monoethanolamine were reacted, 2.608 kg. of ethyl alcohol being recovered. The resulting monoethanolamine-substituted ethyl polysilicate was reacted with 4.366 kg. of 1,2-propylene oxide by maintaining the mixture at 45° C. for three hours under reflux. At the end of this time, an exothermic reaction took place raising the temperature to 100° C.

10 ml. of the reaction product with 2 ml. of water gelled in 12 minutes. It may be used for binding refractory powders.

*Example 24*

Monoethanolamine orthosilicate (0.25 mole) was heated with 1,2-epoxy-3-phenoxy-propane (2 mols) for two hours at 100° C. The condensation product was a very viscous yelow oil immiscible with water, not forming a precipitate at the interface.

*Example 25*

Crucibles were prepared from sillimanite powder and product C of Example 1 as follows:

49.5 g. of sillimanite, all passing a 100 mesh I.M.M. sieve (which has an aperture size of 0.127 mm.), were mixed with 27.5 g. of sillimanite, all passing a 30 mesh I.M.M. sieve (which has an aperture size of 0.421 mm.) and all retained on an 80 mesh I.M.M. sieve (which has aperture size of 0.157 mm.). To this mixture were added 20 ml. of product C, and 8 ml. of water. The working life of the slurry so obtained was about 35 minutes. The slurry was poured into a crucible mould made from brass. On setting, the slurry gave a crucible which was easily removable from the mould.

*Example 26*

To obtain a less fluid slurry than that employed in Example 25, with a shorter working life, the proportions of sillimanite and product C were altered. 45 g. of sillimanite, all passing a 100 mesh I.M.M. sieve and 25 g. of sillimanite all passing a 30 mesh I.M.M. sieve and all retained on an 80 mesh I.M.M. sieve were mixed. To this mixture was added 15 ml. of product C and 6 ml. of water. The working life of the slurry so obtained was 20–25 minutes. The slurry was poured into a crucible mould made from brass. On setting the slurry gave a crucible which was easily removable from the mould.

The crucibles made by this and the preceding example were allowed to dry at room temperature overnight. To develop the silica bond, they were fired to 1300° C. in the course of 2 hours, and held at this temperature for five hours.

*Example 27*

This shows the use of the product of Example 2 as an emulsifying agent. 50 ml. of liquid paraffin, 5 ml. of the product of Example 2, and 200 ml. of water were stirred with a high speed stirrer for 5 minutes. A fine, stable emulsion was formed. This emulsion is suitable for the lubrication of textile yarns.

*Example 28*

This also shows the use of the product of Example 2 as an emulsifying agent. 50 ml. of ethyl polysilicate, 5 ml. of the product of Example 2 and 200 ml. of water were stirred with a high speed stirrer for 5 minutes. A fine emulsion was formed. On standing for 24 hours this emulsion gave a gel. Such an emulsion can be used for delustering textile fabrics and for binding powdered refractory materials.

*Example 29*

Crucibles were prepared from sillimanite powder and the condensation product of Example 5 as follows:

45 g. of sillimanite all passing a 100 I.M.M. sieve were mixed with 25 g. of sillimanite, all passing a 30 I.M.M. sieve, and all retained on an 80 I.M.M. sieve. To this mixture were added 20 ml. of the condensation product, and 6 ml. water. The working life of the slurry so obtained was 15-20 minutes. The slurry was poured into a crucible mould made from brass. On setting the slurry gave a crucible which was easily removable from the mould.

The crucible made was allowed to dry at room temperature overnight. To develop the silica bond, it was fired to 1300° C. in the course of two hours and held at this temperature for six hours.

*Example 30*

A stable emulsion was prepared by adding a mixture of 70 ml. of liquid paraffin and 5 ml. of the condensation product of Example 10 to 30 ml. of water and vigorously stirring for 5 minutes.

*Example 31*

A very stable, fine emulsion was prepared by adding a mixture of 70 ml. of liquid paraffin and 5 ml. of the condensation product of Example 4 to 30 ml. of water and vigorously stirring for 5 minutes.

*Example 32*

A mixture of 50 g. of heavy white oil and 4 g. of the condensation product of Example 20 were added with vigorous stirring to 50 g. of distilled water, giving a stable emulsion.

*Example 33*

A polish was prepared by adding a mixture of

|  | G. |
|---|---|
| Heavy white oil | 12 |
| White spirit | 12 |
| Condensation product of Example 20 | 6 | to a suspension of 33 g. of very finely divided silica in 143 g. of water containing 2 g. of 2-amino-2 methyl propan-1-ol; if desired, the aminoalcohol can be omitted. Vigorous high speed stirring is essential during the addition. The resulting emulsion spread well, and gave a good gloss on polishing.

*Example 34*

A polish was prepared by adding a mixture of

|  | G. |
|---|---|
| Heavy white oil | 6 |
| Condensation product of Example 20 | 3 | to a suspension of 16 g. of very finely divided silica in 85 g. of water containing 2 g. of the condensation product of Example 19. Vigorous high speed stirring is essential during the addition. The resulting emulsion spread well, giving a water-repellant surface on polishing.

*Example 35*

An automobile polish was prepared by melting a mixture of

|  | G. |
|---|---|
| Carnauba wax | 1.5 |
| Microcrystalline wax containing 2% butyl rubber | 3.5 |
| White spirit | 2.5 |
| Condensation product of Example 21 | 5 | and adding the molten mixture to a suspension of 5 g. of very finely divided silica in 35 g. of water at 90° C. Vigorous high speed stirring is essential during the addition. The resulting emulsion spread well and gave a good polish. Better results were obtained by replacing the white spirit with the same weight of butyl phthalate. A finer emulsion was obtained when 5 g. of oleic acid were included in the wax mixture.

What is claimed is:

1. A condensation product of an aminoalkyl silicate and an oxirane compound, said oxirane compound having the formula:

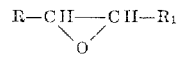

wherein R and $R_1$ are selected from the class consisting of hydrogen; unsubstituted, saturated and unsaturated aliphatic groups with 1 to 6 carbon atoms; saturated and unsaturated aliphatic groups containing 1 to 6 carbon atoms substituted by a group selected from the class consisting of hydroxyl, allyloxy and phenoxy groups; the phenyl group; an alkylphenyl group of which the alkyl radical has 1 to 6 carbon atoms; and the benzyl group; and said aminoalkyl silicate being a silicate selected from the class consisting of (a) those aminoalkyl silicates in which all the ester groups are aminoalkyl groups derived from an amino-alcohol of the formula $R_4$—NH—$R_5$ where $R_4$ is a hydroxyalkyl group containing 1 to 6 carbon atoms, $R_5$ is selected from the class consisting of hydrogen and alkyl and monohydroxyalkyl groups containing 1 to 6 carbon atoms, the number of hydroxyl groups of the alcohol not exceeding 2; and (b) those aminoalkyl silicates in which (aa) only some of the ester groups are aminoalkyl groups derived from an alcohol of the said formula $R_4$—NH—$R_5$, (bb) the remaining ester groups are groups of the formula $R_3O$ where $R_3$ is an alkyl group containing 1 to 15 carbon atoms, and (cc) the number of aminoalkyl groups of the silicate is at least 0.1 per silicon atom.

2. A condensation product as claimed in claim 1 in which the silicate is an orthosilicate of the formula $Si(OR_2)_x(OR_3)_{4-x}$ wherein $R_2$ is an aminoalkyl group, and $x$ is an integer with a value of from 1 to 4.

3. A condensation product as claimed in claim 1 obtained by condensing at least about 0.25 mol. of oxirane compound per active amino hydrogen atom of the aminoalkyl silicate.

4. A condensation product as claimed in claim 1 in which R represents hydrogen.

5. A process for preparing novel products comprising reacting an oxirane compound as defined in claim 1 with an aminoalkyl silicate as defined in claim 1 to effect condensation of the oxirane group of the oxirane compound with an amino group of the silicate.

6. A process for perparing novel products comprising reacting an oxirane compound of the formula:

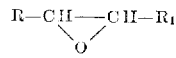

wherein R and $R_1$ are selected from the class consisting of hydrogen, unsubstituted saturated and unsaturated aliphatic groups with 1 to 6 carbon atoms, the phenyl group, an alkylphenyl group of which the alkyl radical has 1 to 6 carbon atoms, and the benzyl group, with an aminoalkyl silicate as defined in claim 1, the reaction being carried out by heating the reactants together at an elevated temperature under reflux.

7. A method of binding particulate refractory material in which refractory material and a condensation product as claimed in claim 1 capable of forming a gel with water are mixed, the mixture shaped to the desired form and the composition allowed to set by the action of water.

8. A method of forming an emulsion in which a mixture of a condensation product as claimed in claim 1 having emulsifying properties and water and a material selected from the group consisting of oils, fats and waxes are vigorously agitated to form an emulsion.

(References on following page)

References Cited in the file of this patent

UNITED STATES PATENTS

| | | |
|---|---|---|
| 2,660,538 | Emblem | Nov. 24, 1953 |
| 2,814,572 | Frye | Nov. 26, 1957 |
| 2,885,419 | Beinfest et al. | May 5, 1959 |
| 2,953,545 | Finestone | Sept. 20, 1960 |

FOREIGN PATENTS

| | | |
|---|---|---|
| 611,990 | Great Britain | Nov. 5, 1948 |
| 154,835 | Australia | Dec. 1, 1949 |
| 166,249 | Austrlia | Jan. 15, 1953 |
| 163,467 | Australia | Jan. 7, 1954 |
| 1,239,808 | France | July 18, 1960 |

UNITED STATES PATENT OFFICE
CERTIFICATE OF CORRECTION

Patent No. 3,110,601            November 12, 1963

Harold Garton Emblem et al.

It is hereby certified that error appears in the above numbered patent requiring correction and that the said Letters Patent should read as corrected below.

Column 1, line 46, for "of" read -- or --; column 2, line 24, for "terta-aminoalkyl" read -- tetra-aminoalkyl --; line 29, for "$Si(OCH_2CH_2H_2)_2(OC_9H_{19})_2$" read -- $Si(OCH_2CH_2NH_2)_2(OC_9H_{19})_2$ --; column 5, lines 44 and 45 and 48, for "condenstation", each occurrence, read -- condensation --; column 10, line 14, for "yelow" read -- yellow --; line 72, after "100" insert -- mesh --; column 12, line 49, for "perparing" read -- preparing --; line 67, for "mxed" read -- mixed --.

Signed and sealed this 12th day of May 1964.

(SEAL)
Attest:

ERNEST W. SWIDER

Attesting Officer

EDWARD J. BRENNER

Commissioner of Patents